Patented Aug. 27, 1940

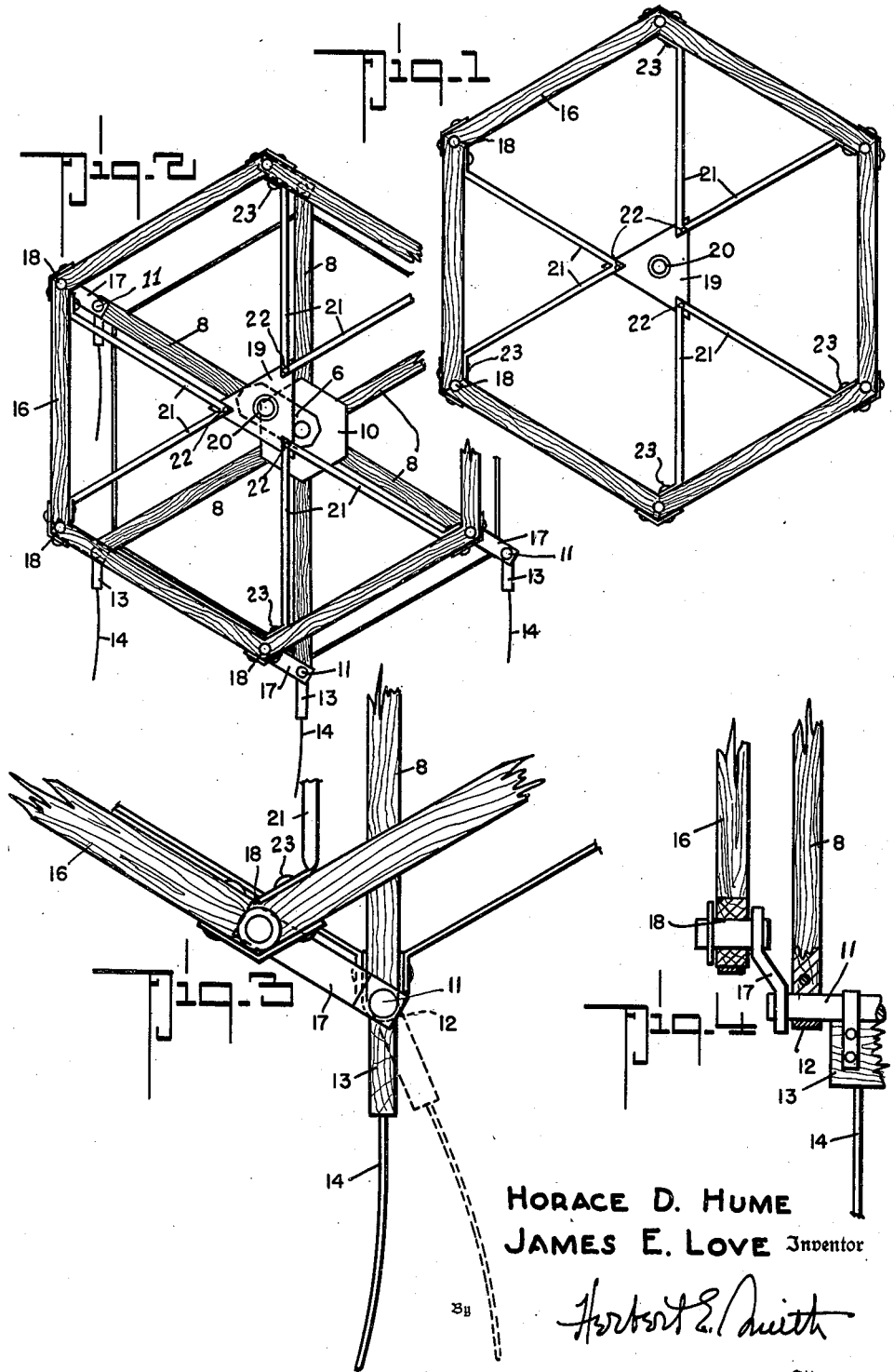

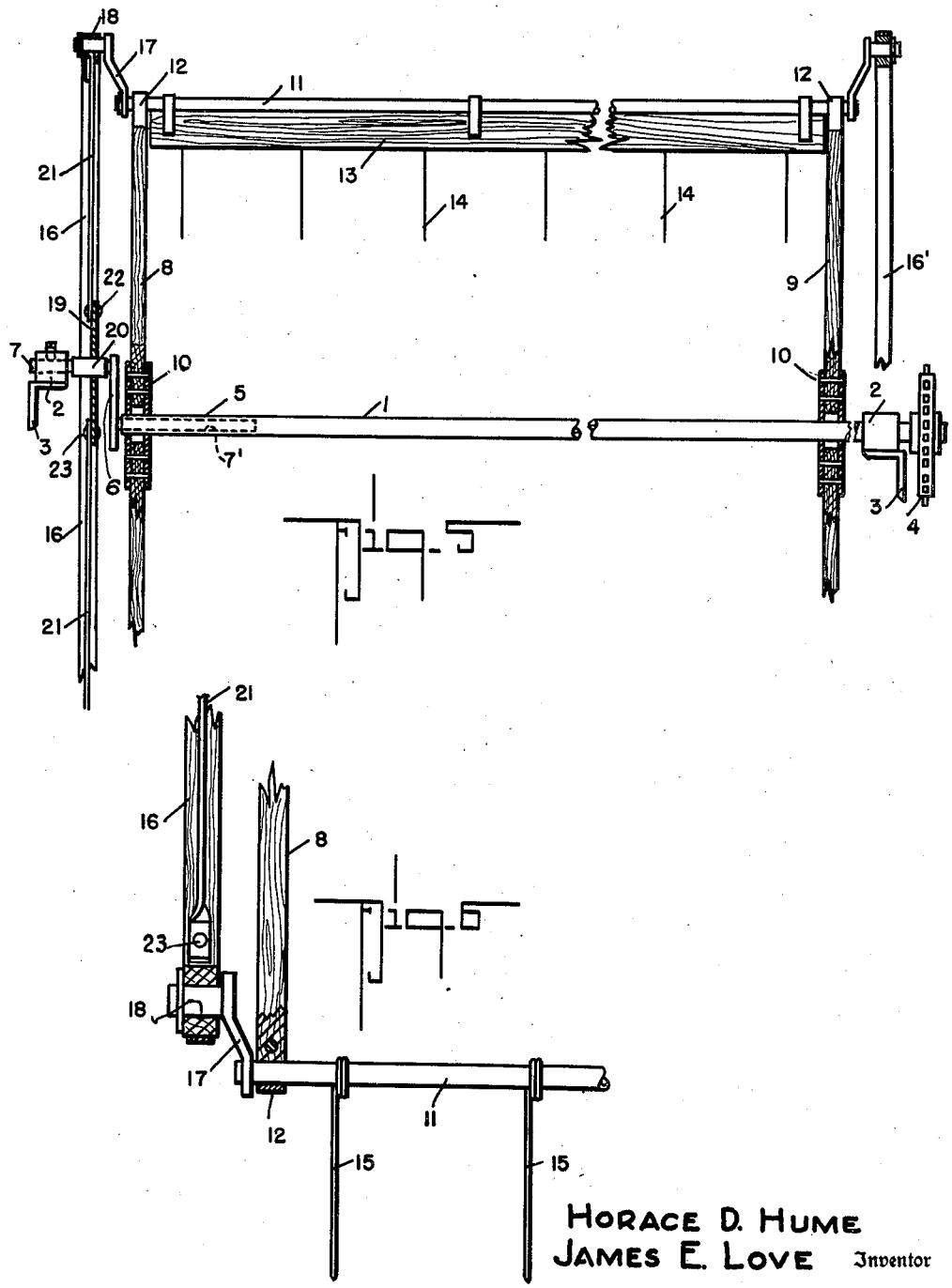

2,212,878

UNITED STATES PATENT OFFICE 2,212,878

HARVESTER REEL

Horace D. Hume and James E. Love,
Garfield, Wash.

Application August 16, 1938, Serial No. 225,102
Renewed December 26, 1939

4 Claims. (Cl. 56—226)

Our present invention relates to improvements in harvester reels of the type employing a supplemental rotary movement for the tine shafts and tines in order that the tines may be maintained in perpendicular position with relation to the ground as they revolve or rotate with the reel. The reel is usually mounted at the front of the harvester in connection with a sickle or reciprocating cutter, and in many instances the cutter is exceedingly long, thus requiring a reel of great length to feed the vines and other ground crops to the cutter. Because, of the excessive length of the reel, difficulty has been experienced in supporting and operating the reel with maximum efficiency, and especially in supporting and operating the means for imparting the supplemental rotary movement to the tine-shafts and tines.

In carrying out our invention we provide a rotary reel having tine shafts and tines and said reel is mounted on the harvester frame through the use of an end bearing for one end of the reel shaft. The other end of the reel is mounted for rotation on a stud shaft and a second stud shaft eccentrically placed with relation thereto upon a crank arm supports an operating head upon the harvester frame. To absorb shocks, vibrations, strains, and other irregularities encountered in the operations of the reel, we mount the operating-head between the stud shaft and the tine-shafts said head possesses flexibility and resiliency, and at the same time insures the necessary rigidity for efficiently actuating the tine-shafts and tines supplementary to the rotation of the reel shaft.

For this purpose the operating head is fashioned with a rigid peripheral frame conforming to the end heads of the reel, a central stable hub member journaled on the crank shaft, eccentrically of the reel and its shaft, and an open framework, as spokes of flexible and resilient material, connecting the hub and the rigid peripheral frame.

The invention as thus described consists in certain novel combinations and arrangements of parts as will hereinafter be more fully set forth and claimed. In the accompanying drawings we have illustrated one complete example of the physical embodiment of our invention involving one type of tines for the reel, in which the parts are combined and arranged in accord with the best mode we have so far devised for the practical application of the principles of our invention.

In addition, we have illustrated a second type of tines mounted on the reel, which tines have imparted thereto a supplemental movement in like manner to the principal illustration.

It will be understood that changes and alterations may be made in the exemplifying structures, within the scope of our appended claims without departing from the principles of the invention.

Figure 1 is a view in side elevation of the operating head for imparting the supplemental rotary movement to the tines.

Figure 2 is a view partly broken away, showing the relation of the operating head to one of the reel-heads or end spider frames of the reel.

Figure 3 is an enlarged detail view showing one of the crank connections between the rigid periphery of the operating head and a tine-shaft and its tines.

Figure 4 is a transverse detail sectional view of parts in Figure 3.

Figure 5 is a fragmentary view in elevation and partly in section, of a reel equipped with the operating head of our invention.

Figure 6 is a detail sectional view similar to Figure 4, but showing another type of tine mounted on the reel.

In order that the general relation and arrangement of parts may readily be understood we have shown in Figure 5, the horizontal reel shaft 1 supported at one end in bearing 2 on the reel frame 3 of the harvester, and the shaft is revolved or rotated through a sprocket-drive from a source of power of the harvester, which drive includes the sprocket wheel 4 on the shaft.

The shaft is provided with a tubular end or bearing-socket 5. A main crank including a crank arm 6 and stud shafts 7 and 7' offset from each other are mounted. The stud shaft 7' is journaled in the socket or bearing 5, and the stud shaft 7 is mounted against rotation in another bearing or boxing 2 on the reel supporting frame 3, so that the reel may revolve with the reel shaft, and the stud shaft 7 mounted in bearing 2 is the shaft for the operating head.

The reel includes spaced heads or spider frames 8 and 9 that radiate from the central hubs 10 secured for rotation with a reel shaft 1. These polygonal heads or spider frames 8 and 9 have a series of tine-shafts 11 journaled at the peripheries of the spider frames in bearings 12. Tine bars or bats 13 are mounted on the shafts 11, and the spring tines 14 are mounted on the bars. The bars and tines are maintained in their adjusted depending positions by means of the operating head. In Figure 6 a different arrangement for the tines 15 is shown, the tine-bar 13 being omitted, and the wire tines 15 being coiled about the shafts 11.

For imparting the supplementary rotary movement to the tine shafts 11 and the tines, an operating head, as 16 may be employed. The operating head is placed at the end of the reel opposite the drive end thereof. The head 16' may be a stabilizing head for the reel and its tines to relieve "whip" or to prevent one end from lagging with relation to the other end.

As here illustrated the reel spiders are of hexagonal shape and the operating head 16 conforms in shape and size to the reel spiders. At each of the six corners of the reel-spider and of the operating head the tine shafts 11 are connected by cranks 17 with the operating head, as at the journal bearings 18, and these bearings 18 as shown are mounted in the rigid peripheral, polygonal frame of the operating head.

The operating head has a central hub member or plate 19 here shown as triangular in shape, and the journal bearing or hub sleeve 20 may be welded to the plate or otherwise secured thereto for supporting the operating head on its shaft 7.

Between the rigid peripheral frame of the operating head and its hub are mounted spokes 21 that provide a flexible resilient cushion to absorb shocks, strains, vibrations and stresses applied to the head through the operation of the reel, and yet this intermediate connection is ample and sufficient to hold the operating head in efficient working condition for timing the tines and to maintain the proper supplemental movement of them as the reel rotates. These flexible and resilient spokes are arranged, preferably in pairs, and may be disposed tangentially of the axis of the shaft 7 or the hub of the operating head, in order to enhance their flexibility and resiliency, and the pairs with their overlapping inner ends are secured to the triangular plate 19 by rivets 22 or other suitable fastening means. The outer ends of each of the spokes are secured, as by rivets 23 to the inner face of the peripheral rigid frame 16 of the operating head.

The supplemental movement of the tines, of course is accomplished through the eccentric or crank mounting of the operating head, and the spokes 21, while of resilient and flexible material, are also placed under tension so that no lost motion nor drag is present in the actuation of the cranks 17 and the attached tine shafts 11. In this manner is provided an intermediate cushion between the hub and the peripheral frame of the operating head.

While we have shown one complete exemplification of our invention, it will be understood that changes and alterations may be made therein, and we therefore do not limit ourselves to the precise structures illustrated.

Having thus fully described our invention, what we claim as new and desire to secure by Letters Patent is:

1. In an operating head for a harvester reel having a supplemental tine-movement, the combination with a rigid peripheral frame, and a central hub-member, of resilient supporting means intermediate of and connected with said frame and hub-member.

2. In an operating head for a harvester reel having a supplemental tine-movement, the combination with a rigid peripheral frame, and a central hub member, of spokes of resilient and flexible material connected at their opposite ends to said frame and hub member.

3. The combination in an operating head for a harvester reel having a supplemental tine movement, with a rigid polygonal frame, and a central hub plate, of a series of pairs of tangentially arranged spokes of resilient and flexible material, and means for affixing the opposite ends of said spokes to the frame and hub plate respectively.

4. The combination with a harvester frame, a rotary reel and its shaft having an end bearing on the frame, and tine-shafts mounted on the reel for a supplemental rotary movement, cranks on the tine shafts of a crank forming an extension of the reel shaft and having a mounting on the frame, an operating head having a hub mounted eccentrically of the reel shaft, said head having a rigid peripheral frame and bearings in said frame for the cranks on the tine-shafts, and resilient supporting means between said hub and frame.

HORACE D. HUME.
JAMES E. LOVE.